United States Patent [19]
Schumacher

[11] Patent Number: 5,651,733
[45] Date of Patent: Jul. 29, 1997

[54] PASSENGER SERVICE APPARATUS IN A PASSENGER CABIN OF AN AIRCRAFT

[75] Inventor: Markus Schumacher, Buxtehude, Germany

[73] Assignee: Daimler-Benz Aerospace Airbus GmbH, Hamburg, Germany

[21] Appl. No.: 588,765

[22] Filed: Jan. 19, 1996

[30] Foreign Application Priority Data

Jan. 28, 1995 [DE] Germany .................. 195 02 658.6

[51] Int. Cl.⁶ .................................................. B64D 13/00
[52] U.S. Cl. ........................... 454/76; 362/73; 362/74
[58] Field of Search ........................... 454/76, 107, 108, 454/109, 112; 244/118.5, 118.6; 362/62, 63, 73, 74

[56] References Cited

U.S. PATENT DOCUMENTS 5,038,256  8/1991  Burkarth ........................... 362/74

FOREIGN PATENT DOCUMENTS 2 682 652  4/1993  France ........................... 362/74
4301681   10/1994  Germany .

*Primary Examiner*—Harold Joyce
*Attorney, Agent, or Firm*—W. G. Fasse; W. F. Fasse

[57] ABSTRACT

A passenger service apparatus in a passenger cabin, especially of an aircraft, includes a service module having comfort and service elements such as reading lamps, flight attendant call buttons, loudspeakers, air nozzles, and the like. The service module is mounted on a spring-biased yielding support arm below the bottom shell of an overhead baggage compartment. An end of the support arm is mounted on the cabin wall and extends generally inwardly toward the middle of the cabin, to position the service module generally centrally above the passenger seats that are to be served by the service module. Connector lines such as electrical conductors and air conduits run along the support arm to connect the service module to a service channel extending along the length of the passenger cabin and including electrical conductors, an air duct, and the like. When the bottom shell of the overhead baggage compartment is lowered to open the baggage compartment, the service module yields downward on the spring-biased support arm while remaining fully functional and reachable by the corresponding passengers at all times, and without hindering the opening of the baggage compartment.

22 Claims, 6 Drawing Sheets

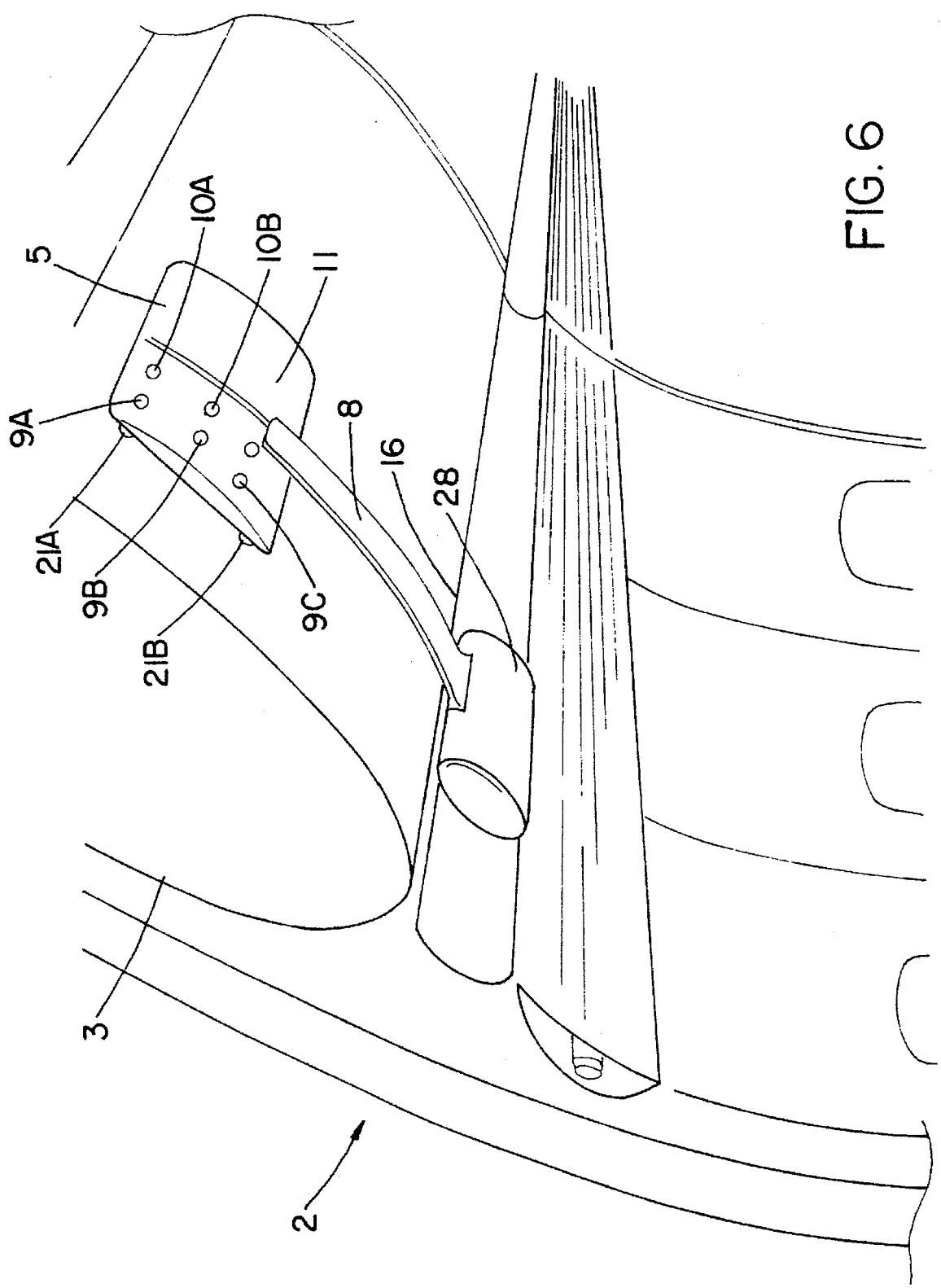

PASSENGER SERVICE APPARATUS IN A PASSENGER CABIN OF AN AIRCRAFT

CROSS-REFERENCE TO RELATED APPLICATION

The present application is related to copending U.S. application Ser. No. 08/184,984, filed on Jan. 24, 1994. The entire disclosure of the related application Ser. No. 08/184,984 is incorporated herein by reference.

FIELD OF THE INVENTION

The invention relates to a passenger service apparatus to be arranged below a baggage compartment in a passenger cabin of a passenger vehicle, especially an aircraft, or a train, boat, spacecraft or other vehicle. The passenger service apparatus comprises a service module including comfort and service elements such as a reading lamp, a flight attendant call button, a loudspeaker, an air nozzle, an oxygen mask, an oxygen generator, and visual display elements, and further comprises connector lines such as electrical conductors and air lines connecting the service module to a service channel.

BACKGROUND INFORMATION

U.S. patent application Ser. No. 08/184,984 of the present inventor, filed Jan. 24, 1994 and now allowed, and corresponding German Patent 4,301,681 disclose an arrangement in which passenger service modules of the above described general type are arranged within the cabin of a passenger aircraft, below the overhead baggage compartments that are arranged near the ceiling of the cabin. The previously disclosed arrangement allows the service modules or panels to be easily readjusted or repositioned to any desired positions along the length of the aircraft cabin, so that the cabin layout can be easily reconfigured if desired. However, it has been found that the previously disclosed arrangement can be improved.

Ever more frequently, the overhead baggage compartments in aircraft are embodied with a lower shell or pan that tilts or drops downward for opening the baggage compartment. Such a construction of the baggage compartments provides a maximum headroom and freedom of motion for the passengers when the compartment is closed, yet ensures that baggage can be easily and conveniently loaded into or unloaded from the baggage compartment when the compartment is open. However, in prior arrangements having substantially rigidly fixed passenger service modules, it has not been possible to arrange the service modules directly below such lowerable baggage compartments, because the service modules would interfere with opening the baggage compartments. For this reason, the passenger service modules are conventionally arranged at locations close to the windows or side walls of the aircraft, where they do not interfere with the downward opening of the baggage compartments, but where they are difficult to reach for passengers, especially passengers seated in the aisle seats.

OBJECTS OF THE INVENTION

In view of the above it is the aim of the invention to achieve the following objects singly or in combination:

- to provide a passenger service apparatus having a passenger service module arranged at a position beneath a lowerable baggage compartment, whereby the service module does not hinder the lowering or opening of the baggage compartment, and whereby the service and comfort elements of the service module are at all times within the range of the comfortable reach of the passengers served by the module;
- to provide such a passenger service apparatus wherein the service module yields elastically downward when the baggage compartment is opened, yet remains fully functional at all times;
- to provide such a passenger service arrangement having a clean-lined outer configuration in which the separate internal components are enclosed; and
- to provide a particularly flat configuration of a service module in such a passenger service apparatus, by locating the relatively large or thick elements such as oxygen generators and light sources remotely from the service module and providing appropriate oxygen supply conduits, fiber optic cables and the like to connect the remote components with the service module.

SUMMARY OF THE INVENTION

The above objects have been achieved in the present passenger service apparatus comprising a service module including various passenger comfort or service elements, and appropriate connector lines that connect the comfort or service elements to a service channel that provides the necessary input and output utilities such as electrical power, electrical signals, and air-conditioned air. Further according to the invention, the service module and the connector lines are mounted below a lowerable baggage compartment on a yieldable spring-biased support arm. The support arm in turn is mounted on the cabin wall or the fuselage structure from where it extends below the baggage compartments generally in a direction toward the center of the cabin, e.g. toward the aisle. In this manner, the service module is preferably positioned generally centrally above the corresponding passenger seats that are to be served by that service module.

The yielding spring-biased support arm carries the service module at the desired position beneath the baggage compartment. When the baggage compartment is tilted or lowered downward in order to open the compartment for stowing or removing baggage, the service module yields downward as the support arm deflects against the spring bias, without hindering the lowering of the baggage compartment and without interfering with the operability of the service module. In this manner, the support arm holds the service module at the desired position above a seating row, and the service module remains fully functional and accessible to the passengers, even when the baggage compartment is lowered.

In particular embodiments, the support arm can itself be embodied as a leaf spring, whereby a very flat and compact structure is achieved, and the need for spring loaded hinges or the like can be avoided. Alternatively, the support arm can be a rigid sectional member, such as a U-shaped sectional member, with the connector lines running along the inside of the sectional member. A flexible conduit can be provided as a sheath around the connector lines. In this manner, the individual components are no longer visible to the passengers, and are also protected from damage. Gliding members, such as felt pads or rollers, can be provided on the top surface of the service module to protect the bottom of the baggage compartment from scratches or other damage when the service module rubs against the baggage compartment as it is opened.

By arranging the support arm a certain spacing distance below the baggage compartment in its closed position, and by providing lamps on the top surface of the service module, the lamps illuminate the bottom of the baggage compartments, and thereby provide a general cabin ceiling illumination. A light source for the cabin illumination, or especially for downward directed reading lamps can be located remotely from the service module, and the light can be conducted to the reading lamps by fiber optic cables. Furthermore, an oxygen generator can also be located remotely from the service module, for example near or in the cabin wall, and connected to the service module oxygen masks by corresponding oxygen conduits. In this manner, an especially flat embodiment of the service apparatus is achieved, since the relatively thick components such as the oxygen generator and the light source, which are conventionally arranged directly within the service module, can now be located remotely from the service module. By this advantageous embodiment, the service module does not unnecessarily encroach upon the headroom of the passengers.

BRIEF DESCRIPTION OF THE DRAWINGS

In order that the invention may be clearly understood, it will now be described, by way of example, with reference to the accompanying drawings, wherein:

FIG. 6 is a perspective view of a fourth example embodiment of a passenger service apparatus according to the invention.

DETAILED DESCRIPTION OF PREFERRED EXAMPLE EMBODIMENTS AND OF THE BEST MODE OF THE INVENTION

Figure 1:
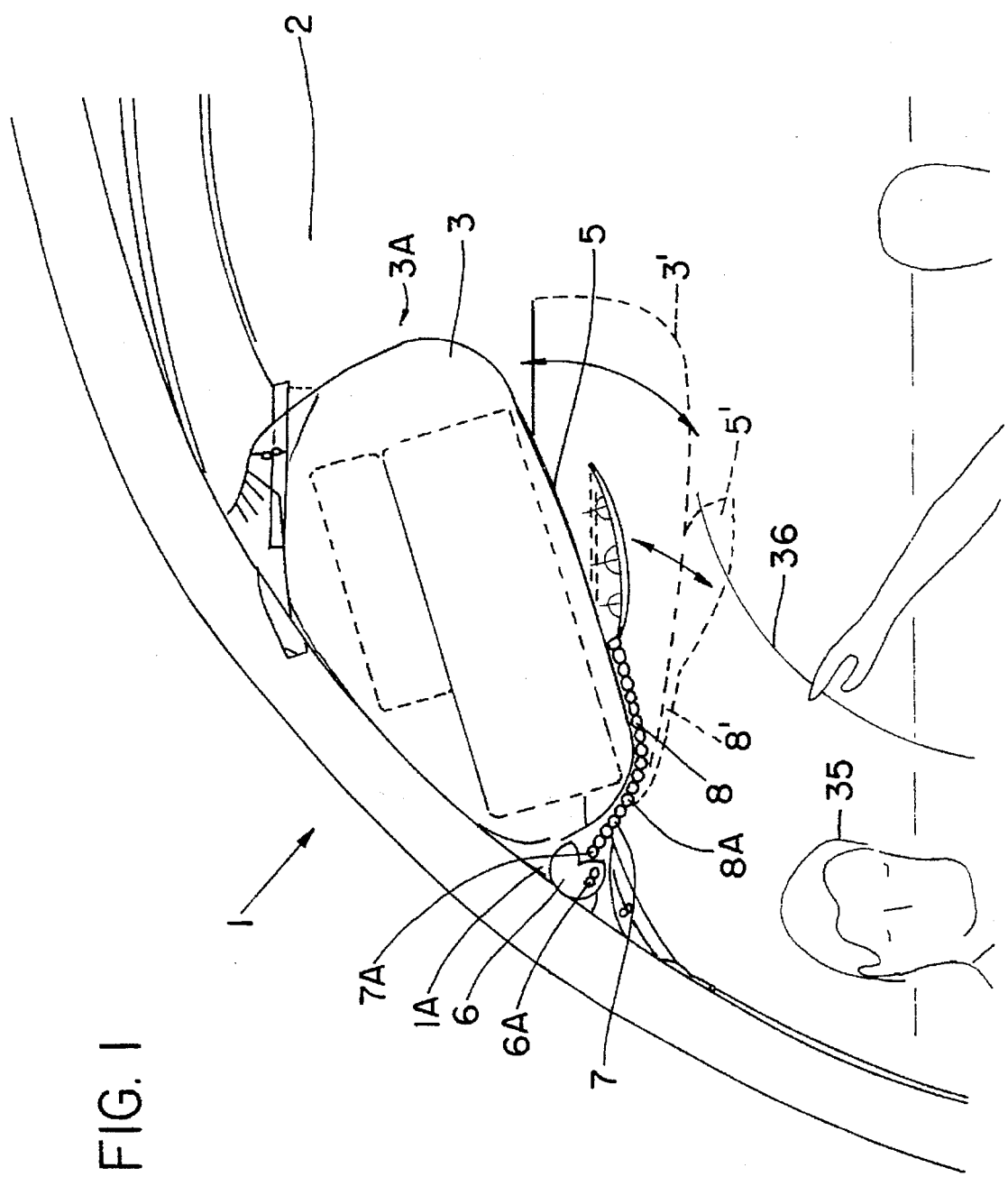
FIG. 1 is a cross-section of the upper portion of one side of a passenger cabin in an aircraft with a passenger service apparatus according to a first embodiment of the invention.

FIG. 1 shows a partial section through an aircraft fuselage 1 within which the upper portion of a passenger cabin 2 is visible. An overhead baggage compartment 3A is arranged near the ceiling of the cabin above the seated passengers 35, and includes a lower shell or pan 3 that is tilted up to be closed and that can be tilted downward to be opened, as shown by dashed lines at 3', so that baggage may be stowed or removed from the baggage compartment. A passenger service module 5 is arranged beneath the lower pan 3 of the overhead baggage compartment 3A, generally centrally above the passengers 35 that are to be serviced by the service module 5. In the preferred position, the service module 5 is within a comfortable range of reach 36 of each of the passengers to be served by the service module.

The passenger service module 5 is essentially equipped with various passenger comfort and service elements, such as for example, reading lamps, flight attendant call buttons, loudspeakers, air nozzles, optical display elements (such as an illuminatable advisory sign, a controllable LED or LCD display, or a video display), a telephone, and an emergency oxygen system including oxygen masks and an oxygen generator. Such various comfort and service elements are known as such, and their detailed construction and installation will be readily understood by persons of ordinary skill in the art. The perspective view of FIG. 2 shows one possible arrangement of reading lamps 9A, 9B, 9C, air nozzles 10A, 10B, 10C, call buttons 12A, 12B, 12C, and an emergency oxygen system 11' that includes oxygen masks and oxygen generators hidden behind a cover panel 11.

Figure 2:
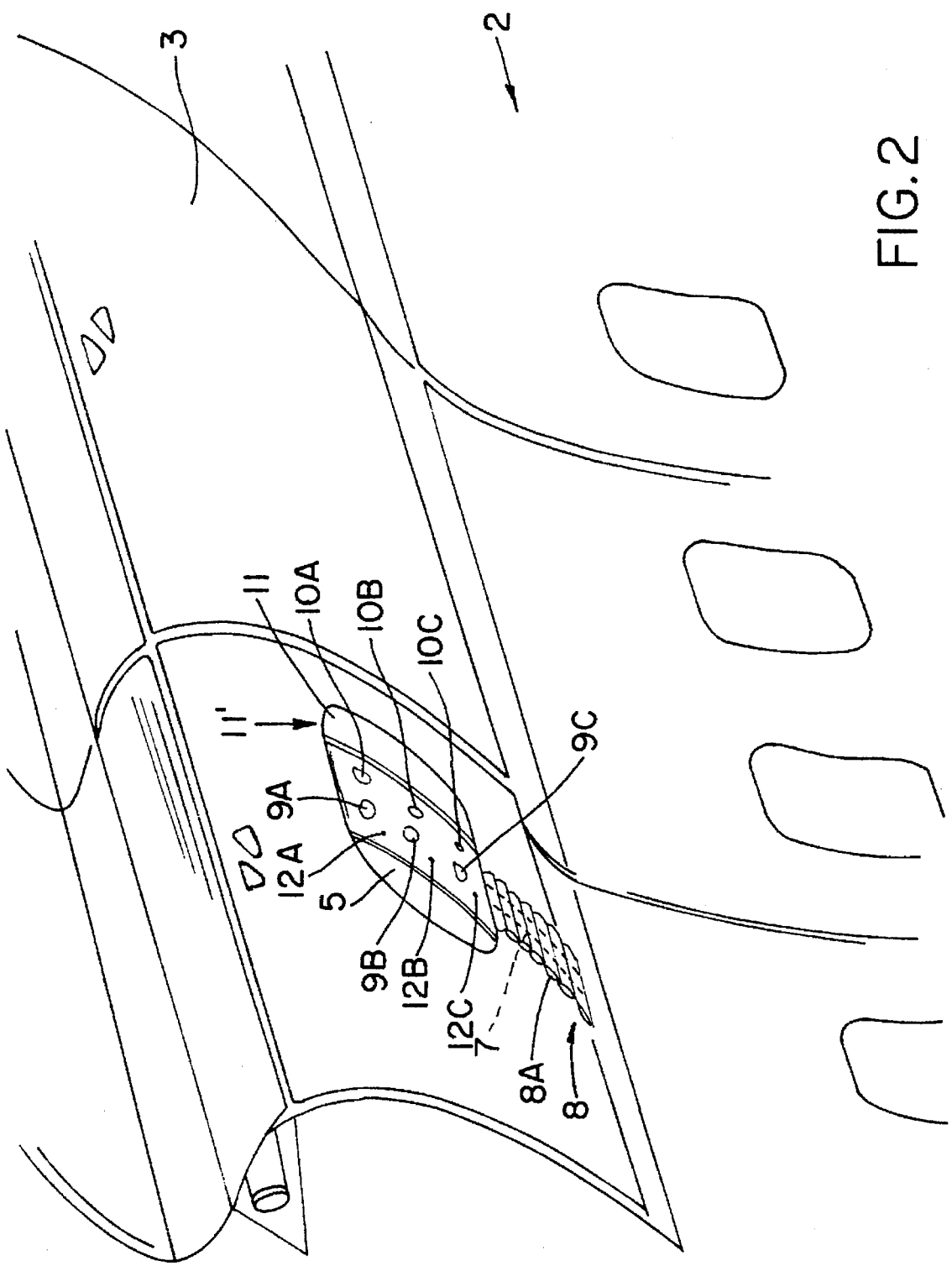
FIG. 2 is a perspective view of the first embodiment of the invention shown in FIG. 1.

As shown in FIGS. 1 and 2, the service module 5 is connected by a plurality of connector lines 7 to a service channel 6 that runs in the lengthwise direction of the aircraft along the passenger cabin near a back edge of the baggage compartments 3A. The service channel 6 includes a plurality of service lines 6A that provide input and output utilities to support all of the separate functions or services provided by the service modules 5. For example, the service channel 6 includes at least one air duct to provide fresh air to the air nozzles 10A to 10C, and includes conductors to carry electrical power to the reading lamps 9A to 9C and to carry electrical or optical signals to and from the call buttons 12A to 12C and the visual display elements. Similarly, the connector lines 7 include air ducts and electrical or optical conductors to connect the corresponding comfort and service elements of the service module 5 to the service channel 6.

Preferably, the connector lines 7 are connected to the corresponding service lines of the service channel 6 by relocatable or repositionable tap connector ends 7A. Thereby the tap connector ends 7A can be easily repositioned along the service channel 6 when it is desired to relocate the service module 5 in the lengthwise direction of the aircraft, for example in order to reconfigure the cabin layout or seat spacing. These features can be further understood from the related U.S. application Ser. No. 08/184,984.

In a preferred embodiment, the service module 5 is attached to a free end of a spring-biased support arm 8, of which the opposite end is connected to the service channel 6 or to a fuselage structural member 1A near the service channel 6. The support arm 8 has a proper length so that the service module 5 is positioned where it can be easily reached at all times by the passengers 35 served by the service module 5. When the lower shell or pan 3 of the overhead baggage compartment 3A is lowered, the support arm 8 and the service module 5 yield to the downward motion and correspondingly swing downward into the respective positions 5' and 8' as shown in FIG. 1. When the lower shell or pan 3 is tilted upward to close the baggage compartment 3A, the service module 5 correspondingly moves upward to return to its initial position due to the spring tension of the support arm 8. If the service module 5 happens to be located below and straddling two adjacent baggage compartments 3A in the lengthwise direction of the aircraft, then the service module 5 will simply yield downward when either one or both of the two adjacent baggage compartments are opened.

The respective connector lines 7 that connect the service module 5 to the service channel 6 are preferably arranged to run along, or within the spring-biased support arm 8. For example, the support arm 8 can be a leaf spring running parallel to the connector lines 7, whereby the leaf spring acts as a spring element that is installed with a pretensioned bias pushing the service module 5 upward. Preferably, the connector lines 7 together with the support arm 8 are enclosed in a protective sheath 8A, which may for example be a bellows or corrugated tube. Alternatively, the sheath 8A may be a flexible tube or pipe that has a pre-tensioned spring characteristic, whereby the flexible tube or pipe simultaneously acts as a hollow spring, to serve as the support arm 8 without any additional leaf spring.

The connector lines 7 are all flexible, so that they remain connected to the service module 5 in all positions and the service module 5 remains fully functional in its fully lowered position 5' as well as any intermediate position. Furthermore, the service module 5 remains within easy reach for the passengers, even in the lowest position 5' of the service module 5 and all intermediate positions.

Figure 3:
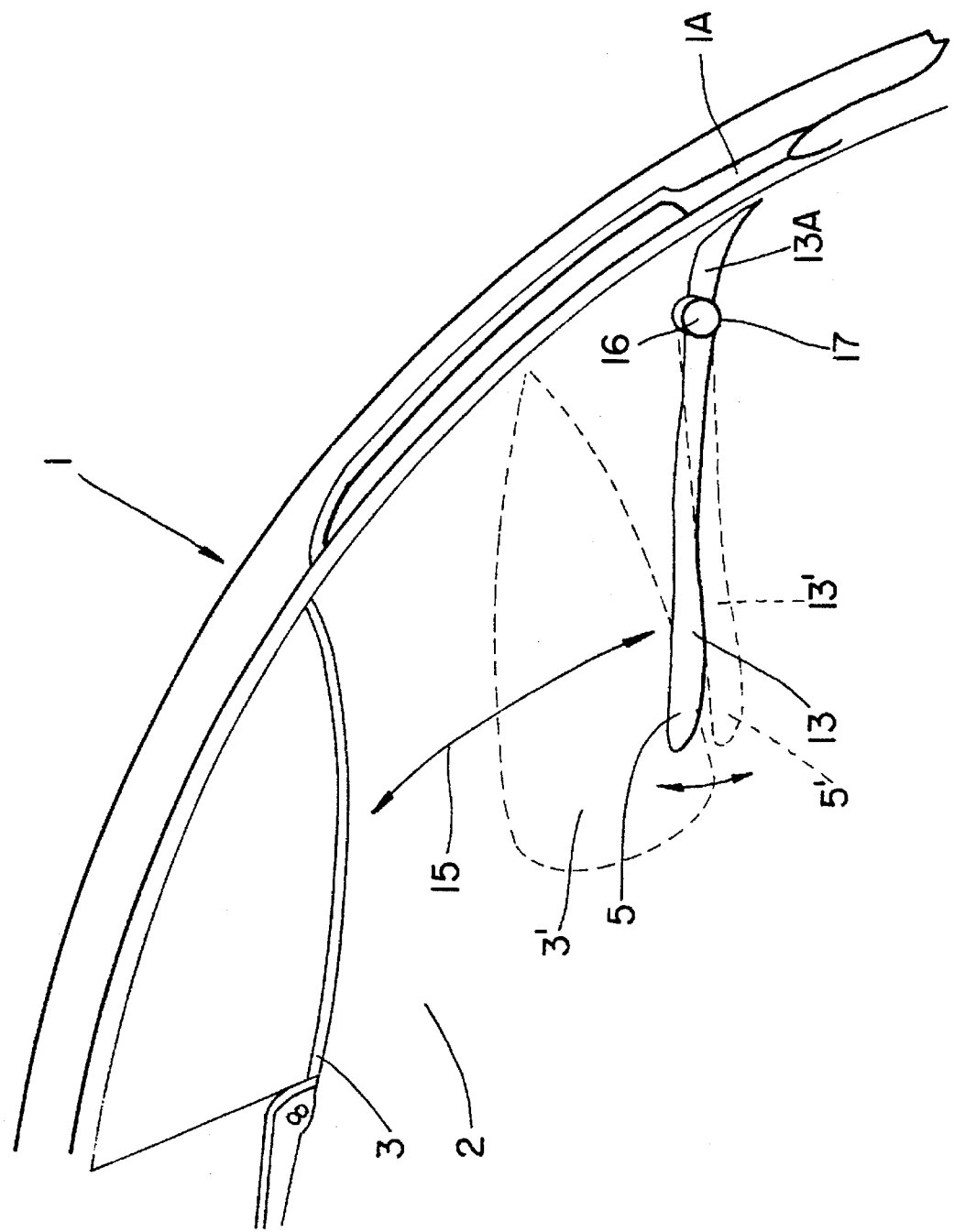
FIG. 3 is a cross-section of the upper portion of one side of a passenger cabin with a passenger service apparatus according to a second embodiment of the invention.
Figure 4:
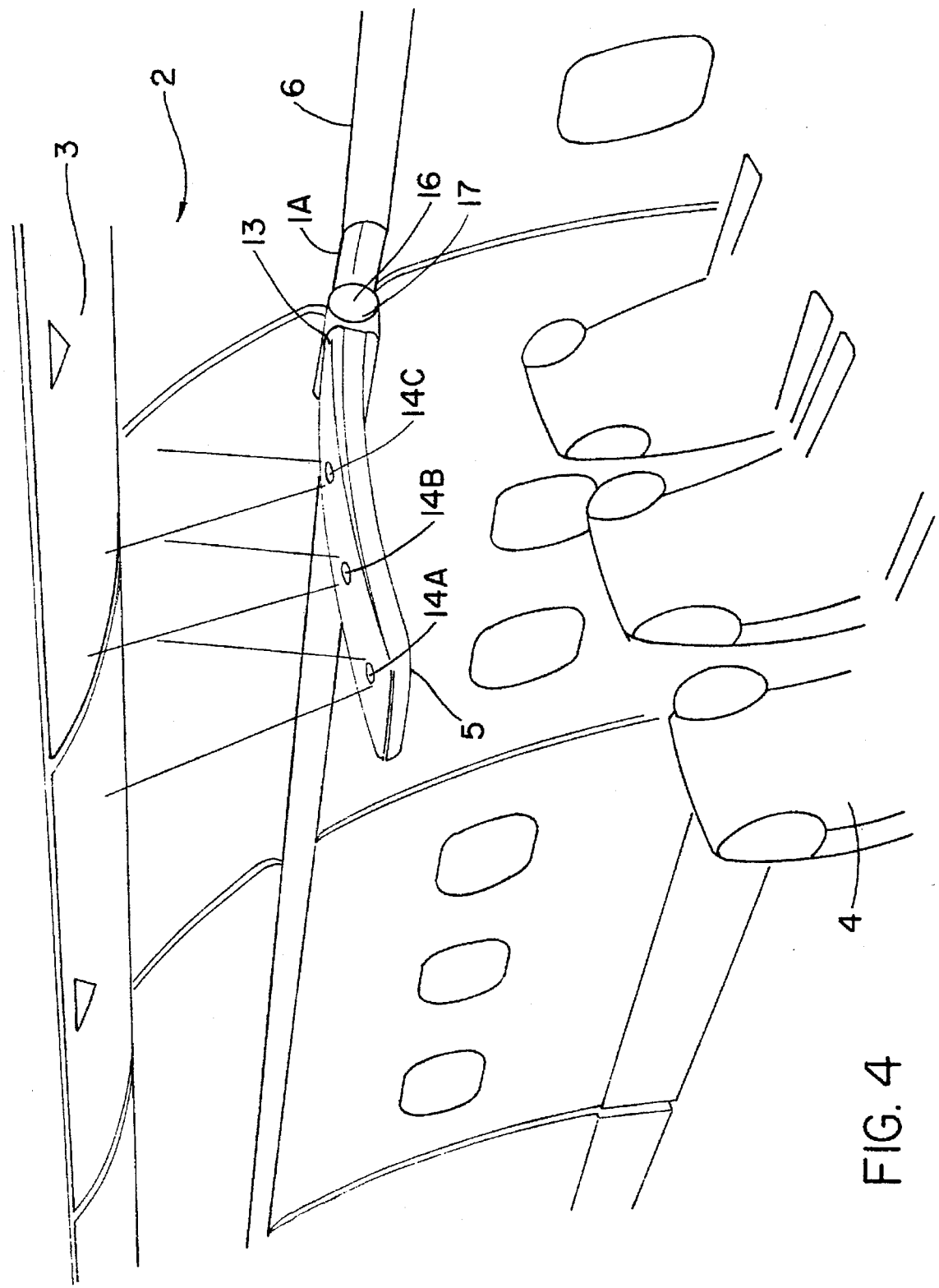
FIG. 4 is a perspective view of the second embodiment of the invention.

FIG. 3 shows a second example embodiment of a passenger service apparatus according to the invention, wherein the passenger service module 5 is arranged or incorporated within an elongated support member 13 that extends inward from the cabin wall generally toward the center of the cabin, e.g. toward the aisle. FIG. 4 shows a perspective view of this support member 13 for the sake of clarity. Any of the above described passenger service and comfort elements, such as reading lamps, call buttons, air nozzles and the like can be mounted on the bottom surface of the support member 13. Thus, all the necessary passenger service and comfort elements for the passengers in one seating row 4 are included within one support member 13. All of the connector lines 7 necessary for the passenger service and comfort elements are also enclosed within the support member 13, where they are hidden from the passengers' view and protected from damage. Furthermore, the support member 13 is arranged a certain spacing distance below the lower shell 3 of the baggage compartment 3A, and includes several general cabin illumination lamps 14A, 14B, and 14C arranged in the top surface of the support member 13. The lamps 14A, 14B and 14C are preferably floodlights that flood illuminate the bottom shell 3 of the luggage compartment 3A to provide a general, indirect illumination of the passenger cabin 2.

As shown in FIG. 3, the lower shell 3 of the overhead baggage compartment 3A is lowerable in a sliding manner as indicated by arrow 15, into a lowered position 3' shown by dashed lines. In order to accommodate the lowering of the baggage compartment lower shell, the support member 13 is embodied to be yieldable, or resiliently deflectable. Namely, when the bottom shell of the baggage compartment is moved into the lower position 3', the support member 13 deflects into its lower position 13'. In order to achieve this, a tilting axis 16 connects the support member 13 to a mounting bracket 13A, which in turn is connected to a fuselage structural member 1A. The mounting bracket member 13A is preferably rather short, so that the tilting axis 16 is close to the cabin side wall. Preferably, the tilting axis 16 is embodied as a spring-biased hinge joint, arranged within a cylindrical housing 17 in which an emergency oxygen generator is arranged. Typically, the emergency oxygen generator is in the form of a cylindrical "candle" that is arranged together with the oxygen masks within the service module 5 itself. By moving the oxygen generator out of the service module 5 and instead into a cylindrical housing 17 at the tilting hinge 16, the service module 5 and the entire support arm 13 can be made especially flat or thin.

Figure 5:
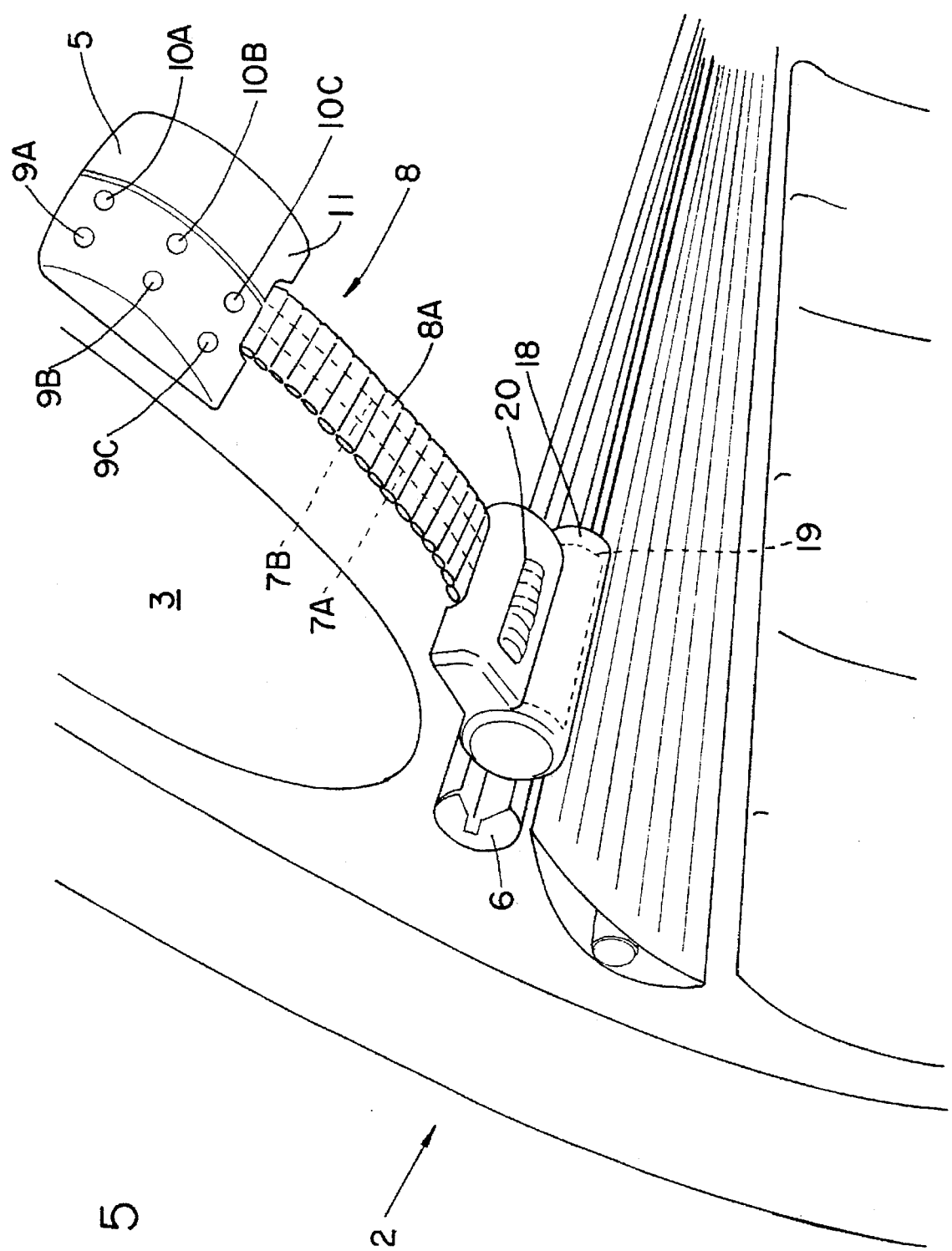
FIG. 5 is a perspective view of a third example embodiment of the passenger service apparatus according to the invention.

FIGS. 5 and 6 are perspective views showing two further example embodiments of a passenger service apparatus according to the invention. The basic construction and configuration of each of the apparatus of FIGS. 5 and 6 is similar to that of the embodiment described with reference to FIGS. 1 and 2. In contrast to the above described first embodiment of FIGS. 1 and 2, however, the third embodiment shown in FIG. 5, and the fourth embodiment shown in FIG. 6 have a service module 5 that is as flat as possible and generally fitted to the contour of the bottom shell 3 of the overhead baggage compartment. Such extremely thin and contour-fitting service modules 5 avoid unnecessarily limiting the headroom of the passengers when the bottom shell 3 of the baggage compartment is lowered.

In order to achieve this thin shape of the service modules 5, the relatively thick functional components are moved out of the service module to a remote location. For example, the oxygen generator 19 and the light source 20 are arranged in a separate housing 18, which is preferably arranged at the fixed end of the support arm 8. Most preferably, the housing 18 simultaneously serves as a connection point for the support arm 8 and the several connector lines 7 to the service channel 6. For the sake of clarity, the oxygen generator 19 is merely schematically shown by dashed lines as a cylinder within the housing 18. Oxygen lines 7B connect the oxygen generator 19 to oxygen masks arranged behind the cover panel 11 of the service module 5. The light source 20 provides light that is conducted to the reading lamps 9A, 9B, and 9C by light conductors, such as fiber optic cables 7A running along within the support arm 8. In another embodiment, which is not shown, the remotely located components are arranged behind the cabin wall, so that they are completely hidden from the passengers.

In the embodiment of FIG. 5, the support arm 8 is embodied as a leaf spring which provides the necessary pre-tension or spring bias. A protective sheath 8A in the form of a flexible bellows encloses and protects the support arm 8 and the connector lines 7. In the embodiment of FIG. 6, the support arm 8 is a substantially flat, rigid sectional member, and the connector lines 7 run inside the sectional member so that they are not visible to the passengers. The necessary spring bias or pretensioning of the support arm 8 is achieved by a spring-loaded hinge joint within a housing 28 that forms a connection point of the support arm 8 to the fuselage structure and of the connector lines 7 to the service channel 6.

As shown, for example, in FIG. 6, gliding members 21A and 21B, such as pads of felt or low-friction plastic such as PTFE, or rollers, are provided on the top surface of the service module 5. The gliding members 21A and 21B allow the service module 5 to slide or roll with only a minimal friction along the bottom shell 3 as the baggage compartment is opened, to avoid scratches or wear marks on the bottom surface of the baggage compartment.

Although the invention has been described with reference to specific example embodiments, it will be appreciated that it is intended to cover all modifications and equivalents within the scope of the appended claims.

What is claimed is:

1. A passenger service apparatus in a passenger cabin of a vehicle that includes a raisable and lowerable overhead baggage compartment arranged over passenger seats that are to be served by said apparatus, said apparatus comprising a yieldable spring-biased support arm mounted by one end at a cabin wall and projecting from said cabin wall generally inwardly toward a center of said cabin below said baggage compartment, a passenger service module including passenger comfort and service elements arranged on said support arm at a position below said baggage compartment and generally centrally above said passenger seats that are to be served by said apparatus, a service channel that provides utilities required by said comfort and service elements, and connector lines running along said support arm and connecting said comfort and service elements to said service channel.

2. The passenger service apparatus of claim 1, wherein said vehicle is an aircraft, said passenger comfort and service elements comprise elements selected from the group consisting of reading lamps, flight attendant call buttons, loudspeakers, air nozzles, visual display elements, and emergency oxygen masks, said service channel runs along said cabin wall in a lengthwise direction of said aircraft and comprises an air duct and a signal or power conductor, and said connector lines comprise an air line and a signal or power conductor.

3. The passenger service apparatus of claim 1, wherein said service channel runs along said cabin wall, said support arm is removably mounted at said cabin wall to be repositionable to a different selected position along said cabin wall, and said connector lines comprise tap connector ends that can be repositioned and reconnected at a different selected position along said service channel.

4. The passenger service apparatus of claim 1, wherein said end of said support arm is mounted at said cabin wall directly proximate said service channel.

5. The passenger service apparatus of claim 1, wherein said support arm is essentially a leaf spring.

6. The passenger service apparatus of claim 1, further comprising a spring-biased hinge device mounting said support arm at said cabin wall, wherein said support arm is essentially a substantially rigid, flat sectional member.

7. The passenger service apparatus of claim 6, wherein said flat sectional member has a U-shaped cross-section, and said connector lines run along inside said U-shaped section.

8. The passenger service apparatus of claim 1, further comprising a protective sheath enclosing said connector lines.

9. The passenger service apparatus of claim 8, wherein said protective sheath also encloses said support arm.

10. The passenger service apparatus of claim 9, wherein said protective sheath comprises a flexible tube.

11. The passenger service apparatus of claim 1, wherein said support arm is essentially a springy yielding flexible tube, and said connector lines run inside said tube.

12. The passenger service apparatus of claim 1, wherein said service module has a top surface facing said baggage compartment and further comprises low-friction contact members arranged on said top surface and positioned to contact said baggage compartment at least when said baggage compartment is lowered.

13. The passenger service apparatus of claim 12, wherein said low-friction contact members comprise rollers.

14. The passenger service apparatus of claim 1, wherein said service module is positioned to be in contact with said baggage compartment substantially at all times, said support arm biases said service module against said baggage compartment and yields downward when said baggage compartment is lowered, and said service module is adapted to remain functional and accessible to passengers seated in said passenger seats when said baggage compartment is lowered.

15. The passenger service apparatus of claim 1, wherein said support arm and said service module are incorporated into an elongated support member, and said connector lines are enclosed in said support member, and further comprising a spring-biased hinge device mounting said support member at said cabin wall.

16. The passenger service apparatus of claim 15, wherein said elongated support member extends generally inwardly from said cabin wall at a spacing distance below said baggage compartment in a raised position thereof.

17. The passenger service apparatus of claim 16, further comprising a lamp arranged on a top side of said elongated support member and positioned to illuminate a bottom surface of said baggage compartment.

18. The passenger service apparatus of claim 1, wherein said passenger comfort and service elements of said service module include reading lamp outlets, and further comprising a light source located externally of said service module, and fiber optic lines connecting said light source with said reading lamp outlets.

19. The passenger service apparatus of claim 18, wherein said light source is located proximate said cabin wall.

20. The passenger service apparatus of claim 1, wherein said passenger comfort and service elements of said service module include an oxygen mask, and further comprising an oxygen generator located externally of said service module, and an oxygen line connecting said oxygen generator with said oxygen mask.

21. The passenger service apparatus of claim 20, wherein said oxygen generator is located proximate said cabin wall.

22. The passenger service apparatus of claim 21, wherein said oxygen generator includes a housing with a tilting journal, and wherein said support arm is connected with said housing to be tiltable about said tilting journal.

* * * * *

UNITED STATES PATENT AND TRADEMARK OFFICE
CERTIFICATE OF CORRECTION

PATENT NO.  : 5,651,733
DATED       : July 29, 1997
INVENTOR(S) : Schumacher

It is certified that error appears in the above-identified patent and that said Letters Patent is hereby corrected as shown below:

Col. 1, line 7, after "Jan. 24, 1994" insert --, Pat. No. 5,556,332--.

Signed and Sealed this

Twenty-first Day of October 1997

Attest:

BRUCE LEHMAN

Attesting Officer

Commissioner of Patents and Trademarks